May 19, 1936. D. E. KNOWLTON 2,041,001
SPRAYING CABINET
Filed Dec. 5, 1935
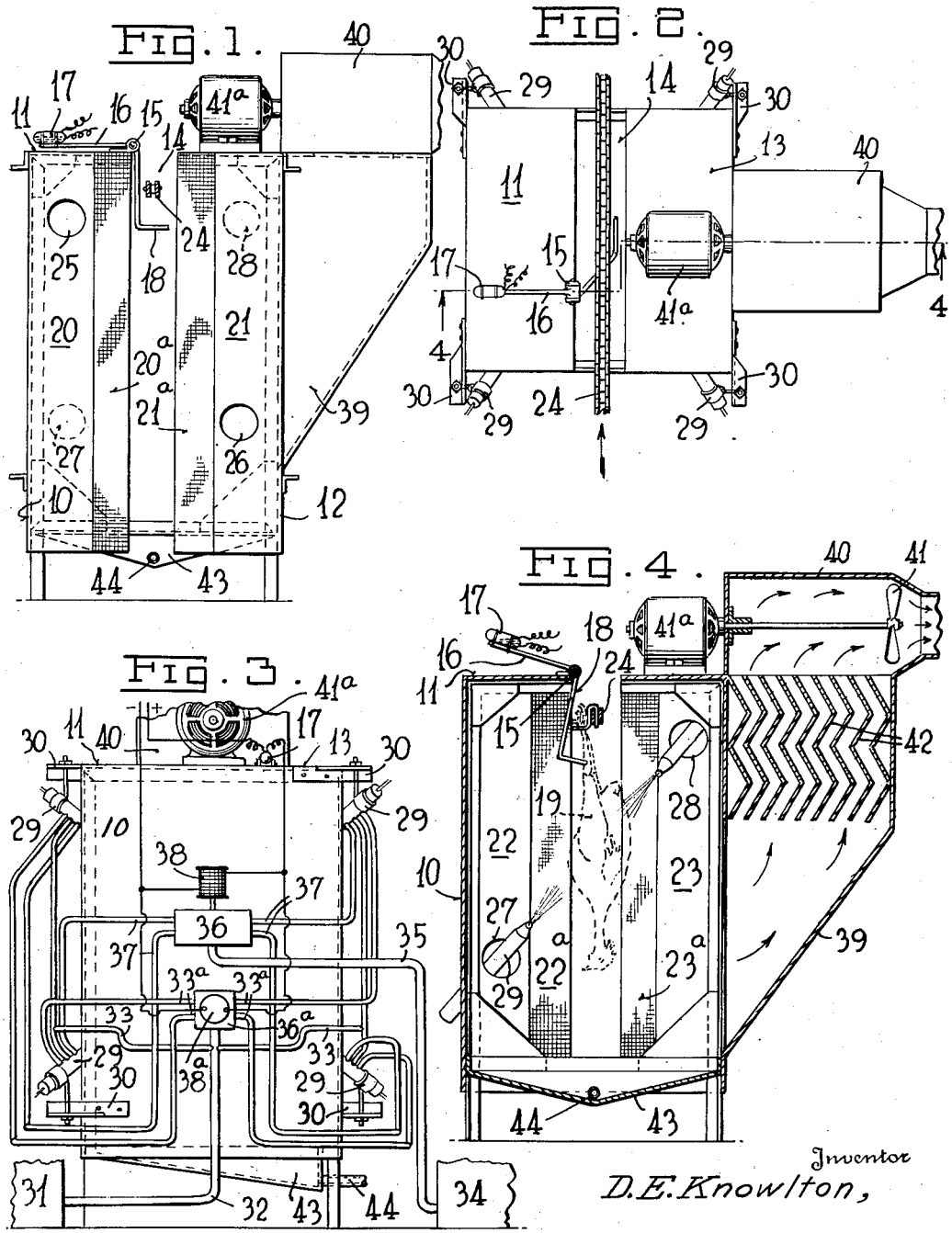
Inventor
D. E. Knowlton, Patented May 19, 1936

2,041,001

UNITED STATES PATENT OFFICE 2,041,001

SPRAYING CABINET

Daniel E. Knowlton, Buffalo, N. Y., assignor to Buffalo Cold Storage Company, Buffalo, N. Y., a corporation of New York Application December 5, 1935, Serial No. 53,056

6 Claims. (Cl. 91—45)

The invention relates particularly to a cabinet in which poultry may be coated.

Dressed poultry may have their appearance affected by being placed in cold storage. It has been discovered that by covering the poultry with a suitable coating this undesirable effect of cold storage may be avoided. It is a purpose of the present invention to provide suitable means for applying such a coating to dressed poultry. Ordinarily poultry having been killed and plucked before being packed for cold storage may be passed through the cabinet of the present invention and there provided with a suitable coating after which they may be packed and placed in cold storage.

The invention in general comprises a partially closed chamber through which the poultry may be passed and in which they may be sprayed with a suitable coating. Means may be provided by which the poultry may be passed through the chamber while suspended from a conveyor. Means may be provided by which the poultry during at least a portion of the passage through the chamber may operate mechanism to cause the spraying apparatus to operate. Means may be provided for withdrawing spray-laden air from the chamber and recovering spray material carried thereby.

In the accompanying drawing one embodiment of the invention is shown. Figure 1 is an end elevation of the spraying chamber. Fig. 2 is a top plan view of the spraying chamber. Fig. 3 is a rear side elevation of the spraying chamber and Fig. 4 is a transverse vertical section on the line 4—4 of Fig. 2.

The spraying chamber comprises a rear side member 10 having at its upper end a forwardly projecting top member 11. The opposite side member 12 has at its upper end a rearwardly extending top member 13. The top members 11 and 13 do not touch each other but are separated so as to leave a transverse passageway 14 between them. Mounted on the top member 11 is a spray controlling device 15. As illustrated this device consists of a pivoted member having one arm 16 carrying a switch 17 here illustrated as a mercury switch, and an inwardly and downwardly extending arm 18 in the path of the moving fowl 19. The spray chamber has at one end end members 20 and 21 projecting from the front and back members 10 and 12 respectively but having their inner edges separated by the intermediate open channel 14. At the other end are similar end members 22 and 23 which likewise are separated by the open channel 14. Passing through the channel 14 is illustrated a conveyor 24 which may be a portion of the conveying mechanism which supports and carries the poultry during the killing and plucking operations. Suspended from the conveyor 24 by its feet is the fowl 19. As the fowl is moved by the conveyor 24 it approaches the end members and passes through the passageway 14. The end members 20, 21, 22 and 23 may be of flexible material or portions of them adjoining the passageway 14 as indicated at 20a, 21a, 22a and 23a may be of flexible material so as to give and allow the passage of poultry which may be of larger dimension than the width of the passageway 14. In the end member 20 is an opening 25 toward its upper end. In the end member 21 is an opening 26 toward its lower end. In the end member 22 is an opening 27 toward its lower end and in the end member 23 is an opening 28 toward its upper end. Projecting through the openings 25, 26, 27 and 28 are spray devices 29 which may be adjustably supported in any suitable well known way from supporting brackets 30 projecting from the front and rear walls 10 and 12 of the cabinet. The spray devices preferably are all directed toward the center of the cabinet or toward that part of the cabinet in which the fowl will be in contact with the controlling arm 18.

The supports for the spray devices, the devices themselves and the mechanism which controls the amount of spray material to them form no part of the present invention but may be of any suitable well known character. One suitable arrangement is diagrammatically illustrated especially in Fig. 3 and may include a source of compressed air 31 from which leads a pipe 32 with branches 33 going to the various spray devices 29. There may also be a source of spray liquid 34 provided with an outlet pipe 35 leading to a distributing chamber 36 from which pipes 37 lead to the various spray guns 29. Within the distributing chamber 36 suitable distributing mechanism such as a valve may be controlled by a solenoid 38, the current for which is controlled by the mercury switch 17 carried by the arm 16. On the pipe 32 may be another distributing chamber 36a from which pipes 33a lead to the various spray guns 29. Within the distributing chamber 36a suitable distributing mechanism such as a valve may be controlled by a solenoid 38a in the same circuit as the solenoid 38. When the mercury switch 17 is in position to cause current to flow through the solenoids 38 and 38a it may operate the distributing mechanism in the boxes 36 and 36a to allow fluid to pass through the pipes 37 to the spray guns 29 and air to pass through the pipes 33a to the spray guns 29. In one specific apparatus the main air inlets 33 may be open while the apparatus is in use and air when let into pipes 33a may operate liquid controlling valves in the spray guns 29. When the switch 17 is in position to not allow electric current to pass through the solenoid 38 no liquid passes through the pipes 36 to the spray guns 29. Suitable valves may be placed at any desired points in the apparatus.

The side 12 of the spraying chamber has a passageway 39 leading from the interior of the spray chamber and connected with an outlet conduit 40 in which may be placed a suitable suction device such as the fan 41 driven by suitable means such as a motor 41a. Baffle plates 42 are arranged in the passageway 39.

The spray chamber is provided with a bottom 43 which is inclined toward an outlet pipe 44.

Poultry having been killed, plucked and defeathered and ready for storage arrives by the conveyor 24 and passes through the side of the spray chamber into the chamber. In its progress through the chamber it engages the arm 18 as indicated in Fig. 4 thus causing the mercury switch 17 carried by the arm 16 to close the circuit through the solenoids 38 and 38a. This causes the spray guns 29 which are directed from four different directions toward the poultry to emit spray and cover the poultry with the spraying liquid in preparation for being placed in cold storage. The spray guns continue to act until the poultry in its passage through the chamber gets out of contact with and releases the arm 18, which may be biased to the position indicated in Fig. 1 by the weight of the mercury switch or by any suitable means such as a spring or gravity. As the poultry releases the arm 18 the mercury switch 17 breaks the contact through the solenoids 38 and 38a and restores the spray guns 29 to the inactive condition. During the operation the fan 41 draws air from the spray chamber through the conduit 40. On its way the baffles 42 remove any liquid carried by the air which may then be released and will fall to the bottom 43.

The outlet from the spray chamber to the passageway 39 may be of any suitable size. By making it large, nearly or quite the size of the entire side 12, there may be avoided any strong draft which may be undesirable especially if localized so as to draw the spray away from the poultry to such an extent as to avoid thoroughly covering the poultry.

Excess liquid present may collect on the bottom 43 and be removed through the pipe 44.

Poultry generally before being packed for cold storage have a paper wrapped about the head. The paper wrapping may be placed on the head of the poultry either before or after the poultry passes through the spray chamber. It may be desirable to pass the poultry through the spray chamber before the paper wrapping is applied. If the paper is applied after the poultry emerges from the spray chamber any tendency of the spray liquid to discolor or stain the paper may be avoided.

It will be noted that the channel 14 is relatively narrow thus tending to prevent the spray liquid from escaping into the surrounding atmosphere. The withdrawal of air through the conduit 40 tends to draw air into the spray chamber through the opening 14 and thus aids in keeping the surrounding atmosphere free from spray liquid. Poultry of various kinds and of various sizes may be treated in the spray chamber. It is not necessary that the opening 14 be large enough to admit of passage through it of the poultry since the borders of the channel opening 14 consist of flexible elements which will give to allow the passage of poultry of any size.

While it may be desirable to have all of the spray guns directed to the center of the spray chamber this is not essential. When treating small poultry one adjustment of the guns may be desirable while when treating larger poultry such as large turkeys it may be desirable to direct the spray guns somewhat away from the center of the chamber. In all adjustments, however, the spray guns preferably will be directed toward the position taken by the poultry during the time it engages the controlling arm 18. This may insure a complete covering of the surface of the poultry with the spray liquid.

Variations and changes may be made in the apparatus and the invention may be embodied in various other forms.

I claim as my invention:

1. A cabinet comprising two side members, top members extending toward each other from the top of each side but leaving a longitudinal opening between them substantially equidistant from each member, end members depending from each end of each top member and extending inwardly from each side member but leaving openings between each pair of end members, said openings being continuations of the opening between the top members and said openings together forming a passage, a conveyor extending through said passage and adapted to support a depending fowl and move it through the cabinet, a movable lever carried by one top member and biased in one position and so arranged with respect to the opening and the conveyor that the lever is moved and held out of its biased position by contact with a fowl carried by the conveyor during at least a part of its passage through the cabinet, each end member comprising a rigid portion adjacent each side member and an inwardly extending flexible portion adapted to give and allow a fowl to pass as it is moved by the conveyor through the opening, each end member being provided with a hole, the holes in oppositely disposed end members being oppositely disposed with respect to the top and bottom of the end members, adjustable spray devices provided with a source of spray material extending through the holes and all directed approximately toward that portion of the cabinet in which the fowl contacts and holds the lever, a mercury switch carried by the lever so arranged and constructed that it controls the spray devices to emit a spray only when the lever is held out of its biased position so as to cover the fowl with spray material; one side member having an opening extending throughout most of its area; an exteriorly extending conduit connected with the last mentioned opening, a suction device to draw the spray laden air from the cabinet, baffles in the conduit to arrest and deposit the spray material, and an inclined bottom for the cabinet to collect deposited spray material.

2. A cabinet comprising two side members, top members extending toward each other from the top of each side but leaving a longitudinal opening between them substantially equidistant from each said member, end members depending from each end of each top member and extending inwardly from each side member but leaving openings between each pair of end members said openings being continuations of the opening between the top members and said openings together forming a passage, a conveyor extending through said passage and adapted to support a depending fowl and move it through the cabinet, means for operating spray devices so arranged that it is engaged by a fowl carried by the conveyor during at least a part of its passage through the cabinet, the arrangement being such as to allow a fowl to pass into and out of the cabinet as it is moved by the conveyor through the opening, and spray devices provided with a source of spray material all directed approximately toward that portion of the cabinet in which the fowl hangs when it engages the operating means.

3. A cabinet comprising two side members, top members extending toward each other from the top of each side but leaving a longitudinal opening between them substantially equidistant from each side member, end members depending from each end of each top member and extending inwardly from each side member but leaving openings between each pair of end members said openings being continuations of the opening between the top members and said openings together forming a passage the arrangement being such as to allow a fowl to pass into and out of the cabinet as it is moved by the conveyor through the openings, a conveyor extending through said passage and adapted to support a depending fowl and move it through the cabinet, means for operating spray devices so arranged with respect to the passage and the conveyor that it is engaged by a fowl carried by the conveyor through at least a part of its passage through the cabinet, each end member being provided with a hole, the holes in oppositely disposed end members being oppositely disposed with respect to the top and bottom of the end members, and spray devices provided with a source of spray material extending through the holes and all directed approximately toward that portion of the cabinet in which the fowl hangs when it engages the operating means, a mercury switch carried by the lever so arranged and constructed that it controls the spray devices to emit a spray only when the lever is held out of its biased position so as to cover the fowl with spray material, one side having an opening extending throughout most of its area; an exteriorly extending conduit connected with the last mentioned opening, a suction device to draw the spray laden air from the cabinet, baffles in the conduit to arrest and deposit the spray material, and an inclined bottom for the cabinet to collect deposited spray material.

4. A cabinet comprising two side members, top members extending toward each other from the top of each side but leaving a longitudinal opening between them substantially equidistant from each side member, end members depending from each end of each top member and extending inwardly from each side member but leaving openings between each pair of end members said openings being continuations of the opening between the top members and said openings together forming a passage, a conveyor extending through said passage and adapted to support a depending fowl and move it through the cabinet, a movable lever so arranged that it is moved and held by contact with a fowl carried by the conveyor during at least a part of its passage through the cabinet, the arrangement being such as to allow a fowl to pass into and out of the cabinet as it is moved by the conveyor through the opening, spray devices provided with a source of spray material all directed approximately toward that portion of the cabinet in which the fowl hangs when it contacts and holds the lever, and a mercury switch carried by the lever so arranged and constructed that it controls the spray devices to emit a spray only when the lever is engaged by a fowl so as to cover the fowl with spray material.

5. A cabinet comprising two side members, top members extending toward each other from the top of each side but leaving a longitudinal opening between them, end members depending from each end of each top member and extending inwardly from each side member but leaving openings between each pair of end members said openings being continuations of the opening between the top members, a conveyor extending through said openings and adapted to support a depending fowl and move it through the cabinet, spray devices provided with a source of spray material all directed approximately toward the center of the cabinet and means in the cabinet so arranged and constructed that it controls the spray devices to emit a spray only when a fowl is passing through the cabinet so as to cover the fowl with spray material.

6. A cabinet comprising two side members, a top member, end members depending from each side of each end of the top member and extending inwardly from each side member but leaving openings between each pair of end members, a conveyor extending through said openings and adapted to support a depending fowl and move it through the cabinet, spray devices provided with a source of spray material all directed approximately toward the center of the cabinet, and means in the cabinet so arranged and constructed that it controls the spray devices to emit spray only when a fowl is passing through the cabinet so as to cover the fowl with spray material.

DANIEL E. KNOWLTON.